US005183136A

United States Patent [19]

Maeda et al.

[11] Patent Number: 5,183,136

[45] Date of Patent: Feb. 2, 1993

[54] PIN BOOT FOR A DISC BRAKE

[75] Inventors: Kazuo Maeda; Koichi Kinoshita, both of Saitama, Japan

[73] Assignee: Akebono Brake Industry Co., Ltd., Tokyo, Japan

[21] Appl. No.: 822,898

[22] Filed: Jan. 21, 1992

[30] Foreign Application Priority Data

Jan. 24, 1991 [JP] Japan .................................. 3-022596

[51] Int. Cl.[5] .............................................. F16D 65/00

[52] U.S. Cl. ........................... 188/73.44; 277/212 FB

[58] Field of Search ................. 188/73.44, 73.45, 71.1, 188/73.31, 73.43; 277/212 FB; 74/18.2

[56] References Cited

U.S. PATENT DOCUMENTS

| | | | |
|---|---|---|---|
| 4,235,313 | 11/1980 | Hirashita | 188/73.44 |
| 4,265,341 | 5/1981 | Kuramoto | 188/73.44 |
| 4,832,161 | 5/1989 | Weiler et al. | 188/73.44 |
| 4,926,979 | 5/1990 | Odaka | 188/73.44 |
| 4,961,480 | 10/1990 | Weiler et al. | 188/73.44 |

FOREIGN PATENT DOCUMENTS

| | | |
|---|---|---|
| 2919075 | 5/1981 | Fed. Rep. of Germany . |
| 2902378 | 7/1981 | Fed. Rep. of Germany . |
| 3633337 | 4/1988 | Fed. Rep. of Germany . |
| 3903744 | 8/1990 | Fed. Rep. of Germany . |

*Primary Examiner*—Douglas C. Butler

*Attorney, Agent, or Firm*—Cushman, Darby & Cushman

[57] ABSTRACT

A pin boot for use in a disc brake including a support mechanism for supporting a disc brake main body, a slide hole and a pin which is fittable with the support member, which pin boot comprises: a flange portion mounted to a boss portion of an opening of the slide hole of the support member; a freely expandable bellows which extends from the flange portion; and a seal portion which adjoins the bellows and is engageable with the pin of the disc brake, characterized in that the rigidity of at least one of the bellows, the seal member and a connecting portion for connecting the bellows with the seal member is non-uniform with respect to peripheral direction thereof.

5 Claims, 4 Drawing Sheets

55 51 52 54 $P_1$ $P_2$ 255
252
250
251
256
Y
Y 250
251
252

PIN BOOT FOR A DISC BRAKE

BACKGROUND OF THE INVENTION

1. Field of the Invention

The present invention relates to a pin boot for use in a disc brake having a caliper supporting mechanism using a pin. More particularly, the invention relates to a pin boot by which, when a pin bolt (which is referred to as a pin) and a pin boot (which is also referred to as a boot) are assembled together, the assembling workability is much improved.

2. Related Art

FIGS. 1 and 2 show a conventional pin boot for use in a disc brake having a caliper supporting mechanism using a pin. When a pin bolt 4 is assembled into a slide hole 3 formed in a support member 2 for supporting a disc brake main body 1 and is assembled into a bellows portion 52 of a pin boot 5 mounted to a boss portion 21 of the support member 2, the air in the slide hole 3 is let out through between the connecting surfaces of the pin 4 and pin boot 5. FIG. 1 shows an arm portion of a caliper of the disc brake.

In a pin boot of this type having no air deflating mechanism, after assembly of the pin, the air collected in the boot must have been manually deflated from a seal portion 51 of the pin boot 5 and, therefore, it takes time and intricate to assemble the pin bolt.

SUMMARY OF THE INVENTION

It is therefore an object of the invention to provide a pin boot for use in a disc brake which, in assembling a pin bolt, eliminates the need to manually deflate the air collected in a bellows of the boot after assembly of the pin and thus can provide an improved assembling workability.

The above and other objects of the invention can be achieved by a provision of a pin boot for use in a disc brake including a support mechanism for supporting a disc brake main body, a slide hole and a pin which is fittable with the support member, which pin boot comprises: a flange portion mounted to a boss portion of an opening of the slide hole of the support member; a freely expandable bellows which extends from the flange portion; and a seal portion which adjoins the bellows and is engageable with the pin of the disc brake, characterized in that the rigidity of at least one of the bellows, the seal member and a connecting portion for connecting the bellows with the seal member is non-uniform with respect to peripheral direction thereof.

According to the invention, owing to the above-mentioned structure, that is, owing to the fact that the rigidity of at least one of the bellows portion, the seal member, and a connection portion for connecting the bellows and seal member to each other is non-uniform in the peripheral direction of the pin boot, the seal member is warped or inclined. With the seal member inclined, the seal member is allowed to go over a tapered portion of the pin, while a part of the seal member is allowed to go over the pin tapered portion ahead of the remaining portions thereof and is fitted into a boot groove in the pin to thereby produce a clearance between the pin and the internal surface of the seam member, so that the air contained in the bellows is let out through the clearance. When the pin is further pressed into the pin boot for assembly, then the whole seal member of the pin boot is fitted into the boot groove formed on the pin bolt due to its elasticity while it tries to remove (recover) the above-mentioned warp or inclination by itself, thereby facilitating the assembly of the pin bolt.

DESCRIPTION OF THE PREFERRED EMBODIMENTS

A detailed description will now be given of the preferred embodiment of a pin boot for use in a disc brake according to the present invention with reference to the accompanying drawings.

Figure 1:
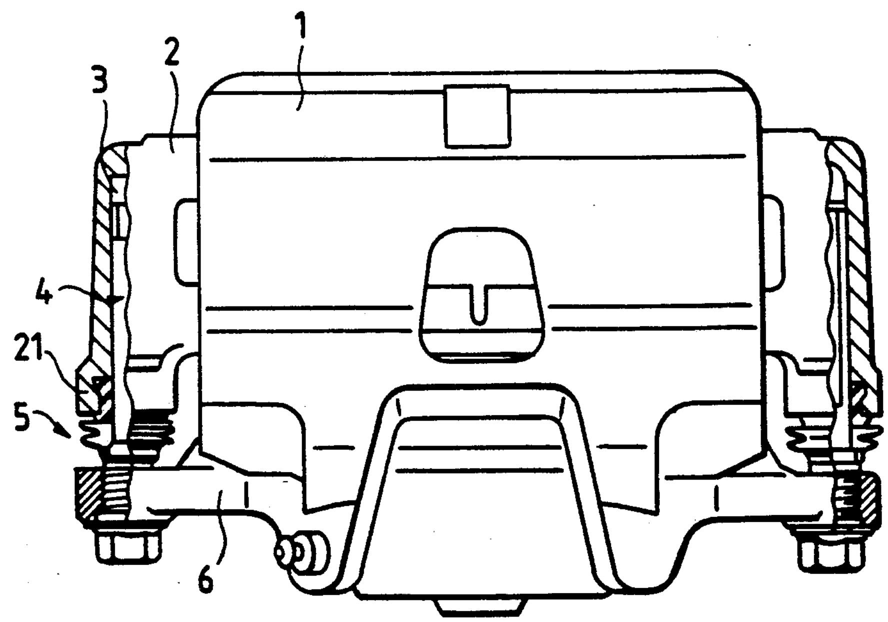
FIG. 1 is a partly sectional plan view of a conventional disc brake having a caliper supporting mechanism using a pin.
Figure 2:
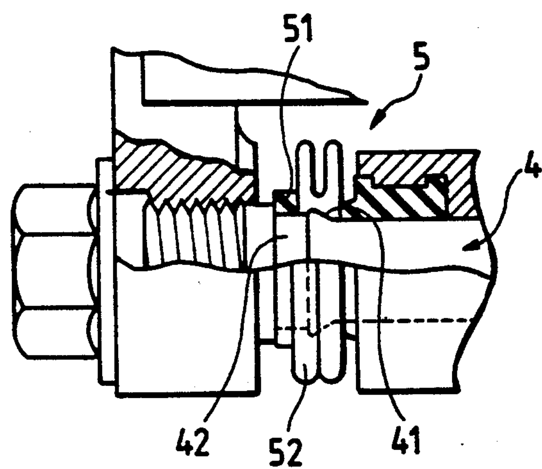
FIG. 2 is an enlarged explanatory view of the engagement between a pin boot and a pin bolt shown in FIG. 1.

Like parts and components are designated by the same reference numerals as used in FIGS. 1 and 2 throughout the figures.

Figure 3B:
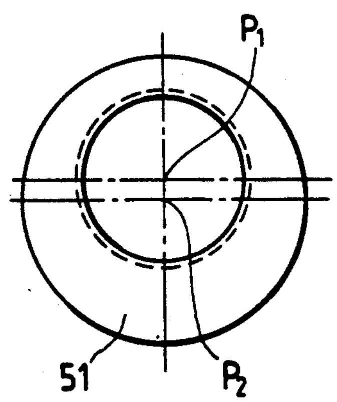
FIG. 3B is a side view of the pin boot shown in FIG. 3A.
Figure 3A:
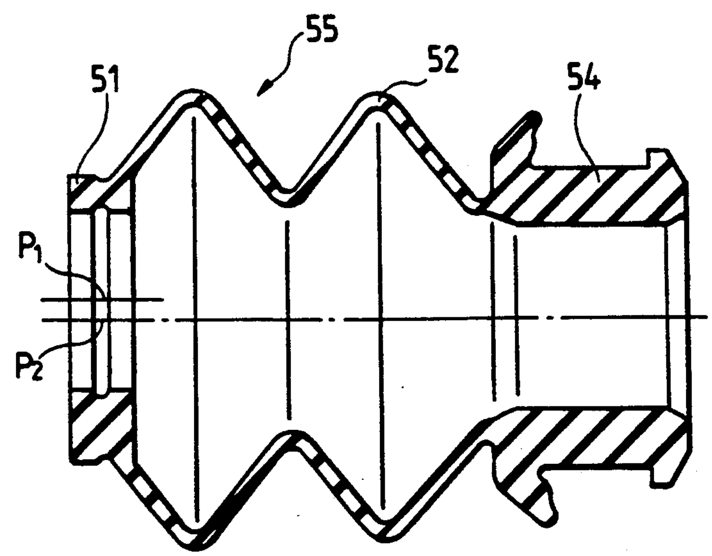
FIG. 3A is a longitudinal sectional view of a first embodiment of a pin boot for use in a disc brake having a caliper supporting mechanism using a pin according to the present invention.

FIG. 3A is a longitudinal sectional view of a first embodiment of a pin boot for use in a disc brake having a caliper supporting mechanism using a pin according to the present invention, and FIG. 3B is a side view of the pin boot shown in FIG. 3A. As shown in FIGS. 3A and 3B, a pin boot 55 is provided with a flange portion 54 engageable with a boss portion 21 at an opening end of a slide hole 3 formed in a support member 2 of the disc brake for supporting a main body 1 of the disc brake, a flexible bellows portion 52, and a seal portion 51 engageable with a pin bolt 4. According to the first embodiment, the center $P_1$ of the inner diameter of the seal part 51 and the center $P_2$ of the outer diameter thereof are shifted from each other to thereby make the rigidity of the seal portion 51 non-uniform in the circumferential direction thereof, so as to provide an air removing mechanism.

Figure 4:
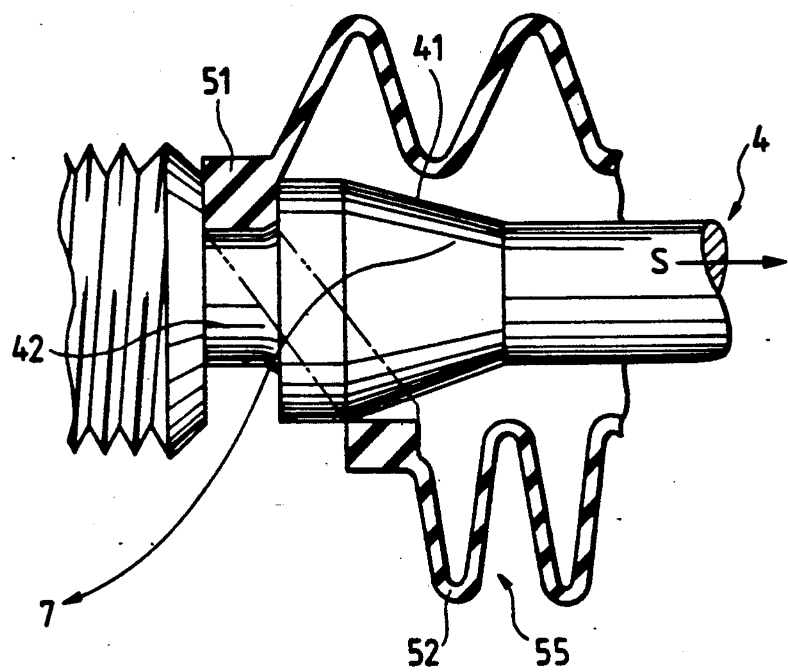
FIG. 4 is a generally explanatory view of the operation of the pin boot according to the first embodiment of the invention.

During the assembly of the pin boot and pin bolt, as shown in FIG. 4, when the pin bolt 4 is moved in a direction of an arrow S and is inserted into the pin boot 55, then the inner peripheral portion of the leading end of the pin boot 55 is brought into contact with the tapered portion 41 of the pin 4 and the seal portion 51 of the pin boot is spread. At the same time, as the pin 4 is inserted, an air pressure within the bellows portion 52 increases to thereby lift up the seal portion 51 due to the air pressure collected in the bellows portion 52, so that the seal portion 51 is allowed to go over the tapered portion 41 of the pin bolt 4.

In this operation, because of the fact that the rigidity of the seal portion 51 is et non-uniform in the circumferential direction thereof, as shown in FIG. 4, a thinner part of the seal portion 51 is warped or inclined and, the inclined seal portion 51 goes over the tapered portion 41 of the pin bolt 4, while a thicker part of the seal portion 51 goes over the tapered portion 41 of the pin 4 ahead of the remaining portions thereof and is fitted into the boot groove 42 of the pin 4. At that time, there is produced a clearance between the pin bolt 4 and the inner surface of the seal portion 51 and the air 7 in the bellows portion 52 is discharged by means of the clearance along the arrows shown in FIG. 4. Further, when the pin bolt 4 is further inserted into and assembled to the pin boot 55, then the whole seal portion 51 is fitted into the boot groove 42 formed on the pin bolt 4 due to its elasticity while it tries by itself to remove (recover) the above-mentioned warp or inclination.

Figure 5A:
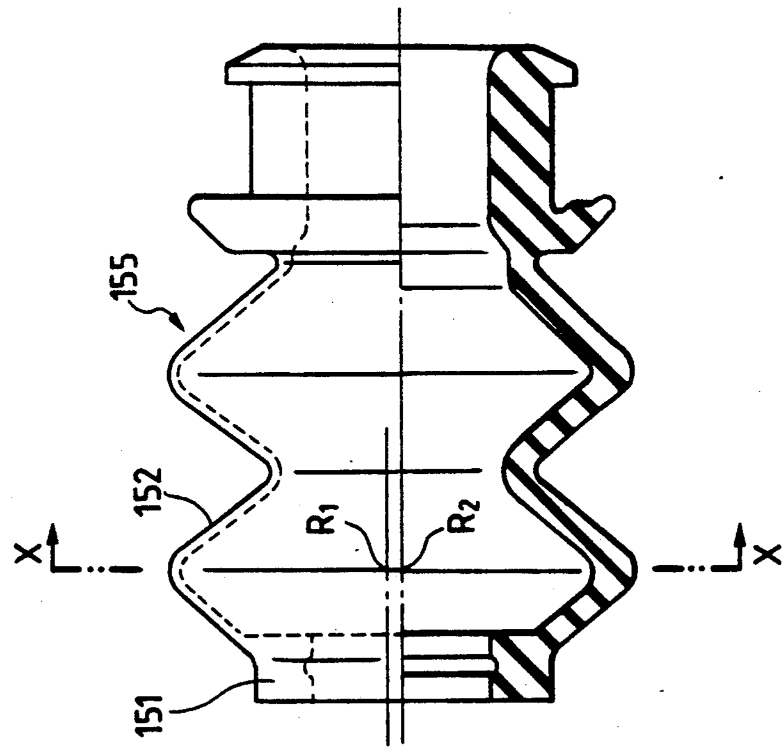
FIG. 5A is a partly sectional front view of a second embodiment of a pin boot according to the present invention.
Figure 5B:
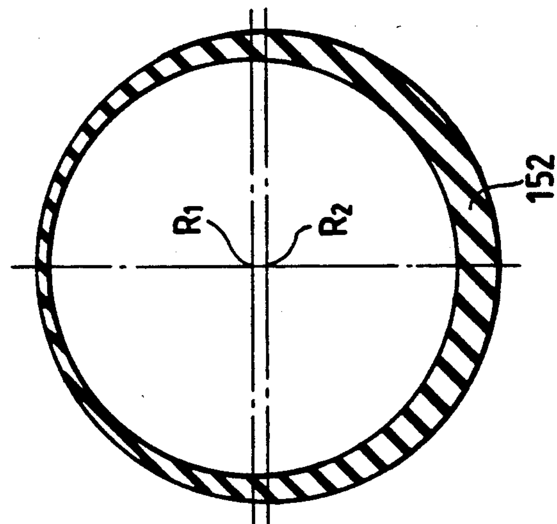
FIG. 5B is a transverse sectional view taken along the line X—X shown in FIG. 5A.

FIG. 5A is a partly sectional front view of a second embodiment of a pin boot according to the present invention, and FIG. 5B is a transverse sectional view taken along the line X—X shown in FIG. 5A. According to the second embodiment, the center $R_1$ of the inner diameter of the pin boot 155 and the center $R_2$ of the outer diameter of the entire bellows portion 152 or the portion of the bellows portion 152 adjacent to the seal portion 151 of the pin boot 155 are shifted from each other to thereby make the rigidity of the bellows portion 152 non-uniform in the circumferential direction thereof, so that an air deflating mechanism is provided.

Similar to the first embodiment described above, according to the second embodiment of the invention, when the pin bolt is inserted into the pin boot, then the seal portion 151 of the pin boot 155 is spread by the tapered portion of the pin and also the seal portion 151 of the pin boot 155 is lifted up due to the increase in the air pressure contained in the bellows portion 152, so that the seal portion 151 is allowed to go over the pin tapered portion. Here, according to the second embodiment, since the center $R_1$ of the inner diameter and the center $R_2$ of the outer diameter of the bellows portion 152 are shifted from each other and, accordingly, the rigidity of the bellows portion 152 is arranged to be non-uniform in the circumferential direction of the pin boot 155, the bellows portion 152 is warped and inclined to thereby cause the seal portion 151 to incline, so that a thinner part of the seal portion 151 goes over the pin tapered portion in the inclined stale whereas a thicker part of the seal portion 51 goes over the tapered portion ahead of the remaining portions thereof to be fitted into the boot groove 42. In this operation, there is produced a clearance between the inner surfaces of the pin bolt and seal portion 151, through which the compressed air contained in the bellows portions 152 is let out. When the pin bolt is further inserted into and assembled to the pin boot 155, then the entire seal portion 151, likewise as in the first embodiment, is fitted into the boot groove 42 formed on the pin bolt due to its elasticity while it tries to remove the above-mentioned warp, that is, inclination by itself.

Figure 6A:
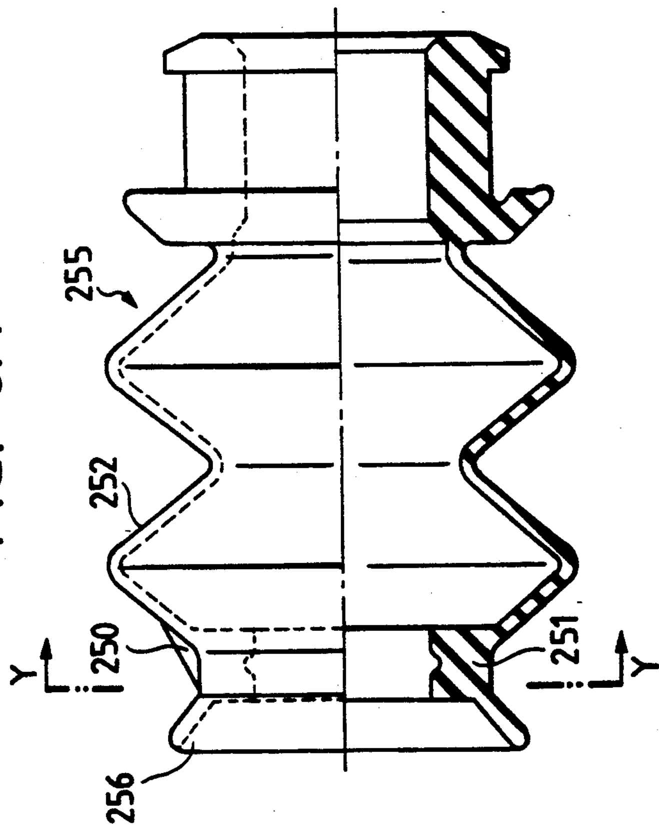
FIG. 6A is a partly sectional front view of a third embodiment of a pin boot according to the present invention.
Figure 6B:
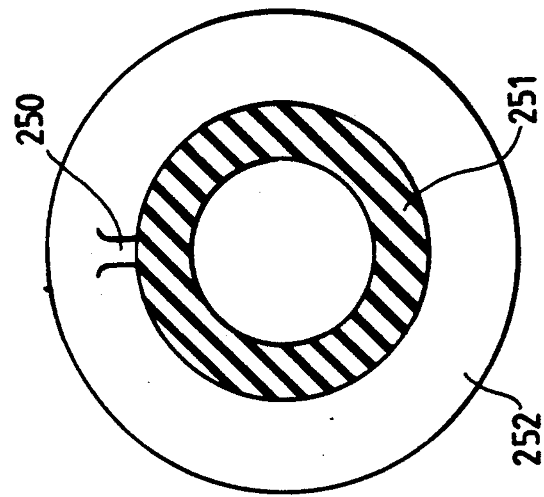
FIG. 6B is a transverse sectional view taken along the line Y—Y shown in FIG. 6A.

FIG. 6A is a partly sectional front view of a third embodiment of a pin boot according to the present invention, and FIG. 6B is a transverse sectional view taken along the line Y—Y shown in FIG. 6A. The pin boot 255 includes a rib 250 in a connecting portion for connecting the seal portion 251 and bellows portion 252 of the pin boot 255. Further the rib 250 is disposed in an inclined manner or in a non-uniform manner in the circumferential direction of the pin boot 255 to thereby make non-uniform the rigidity of the connecting portion for connecting the seal portion 251 and the bellows portion 252, in order to provide an air deflating mechanism.

The above-described respective portions respectively having the above-described structures can be manufactured and can then be combined with one another in a suitable manner to thereby provide a pin boot. As shown in FIG. 6A, the pin boot 255 also includes a skirt portion 256.

Likewise as in the first and second embodiments mentioned above, according to the third embodiment, when the pin bolt is inserted into the pin boot, then the seal portion 251 of the pin boot 255 is spread by the tapered portion of the pin and the seal portion 51 of the pin boot 255 is lifted up due to the increase in the air pressure in the bellows portion 252, so that the seal portion 251 is allowed to go over the tapered portion of the pin. However, according to the third embodiment, due to the fact that the rib 250 is provided in a connecting portion for connecting the seal portion 251 and bellows portion 252 of the pin boot 255, the rib 250 is not disposed in a non-uniform manner, that is, it is disposed in an inclined manner, and the rigidity of the connecting portion for connecting the seal portion 251 and bellows portion 252 is set non-uniform in the circumferential direction of the pin boot 255, the connecting portion for connecting the seal portion 251 and bellows portion 252 of the pin boot 250 is warped and inclined to thereby incline the seal portion 251, so that the seal portion 251 goes over the tapered portion of the pin in the inclined state and a part of the seal portion 251 goes over the pin tapered portion ahead of the remaining portions thereof and is fitted into the boot groove 42 formed on the pin bolt.

During the above operation, there is caused a clearance between the pin and the inner surface of the seal portion 251, through which the air in the bellows portion 252 is let out. Then when the pin bolt is further inserted into and assembled to the pin boot 255, then the entire seal portion 251 similarly as in the first embodiment, is fitted into the boot groove 42 formed on the pin bolt due to its elasticity while trying to remove its warp or inclination by itself.

As has been described heretofore, according to the present invention, in assembling the pin bolt into the slide hole 3 formed in the support member 2 for supporting the disc brake main body 1 or into the bellows portion 52 of the boot 5 mounted to the boss portion 21 of the support member 2, when the pin bolt is moved and inserted into the pin boot 5 to thereby bring the inner peripheral portion of the leading end of the pin boot into contact with the tapered portion of the pin, then the seal portion 51 of the pin boot 5 is spread and the air pressure in the bellows portion increases due to the insertion of the pin to lift up the seal portion by means of the pressure of the air collected in the bellows portion, so that the seal portion is allowed to go over the pin tapered portion. Here, due to the fact that the rigidity of at least one of the seal portion, the bellows portion and the connecting portion of the pin boot for connecting the bellows and seal portions is arranged to be non-uniform in the circumferential direction of the pin boot, a thinner part of the seal portion 51 is caused to warp or incline and the seal portion 51 goes over the pin tapered portion in the inclined state, while a thicker part of the seal portion is allowed to go over the pin tapered portion ahead of the remaining portion thereof and is fitted into and attached to the boot groove 42 formed on the pin.

During this operation, there is produced a clearance between the pin and the inner surface of the seal portion, through which the air 7 in the bellows portion is let out. Then, when the pin bolt is further inserted into and assembled to the pin boot, then the entire seal portion 51 is fitted into the boot groove 42 formed on the pin bolt due to its elasticity while it removes (recovers) the above-mentioned warp or inclination by itself. Therefore, there is eliminated the need to let out the air collected in the bellows portion by hand after assembly of the pin bolt as in the conventional pin boot for use in the disc brake, thereby causing a great improvement in the workability in assembling the pin bolt into the slide hole formed in the support part of the disc brake for supporting the disc brake main body and also into the bellows portion of the boot mounted to the boss portion of the support member.

What is claimed is:

1. A pin boot for a disc brake having a caliper supporting member for supporting a disc brake body member, the supporting member having a slide hole provided on one of said members and a pin fittable into the other of said members, comprising:

a flange mounted to a boss portion in an opening formed in the slide hole;

a flexible bellows portion extending from said flange; and a seal portion adjoining the bellows portion and engageable with said pin, wherein the rigidity of at least one of said bellows portion, said seal portion and a connecting portion for connecting said bellows and seal portion with each other is non-uniform in the circumferential direction thereof.

2. The pin boot of claim 1, wherein a center of an inner diameter and a center of an outer diameter of said seal portion are shifted from each other.

3. The pin boot of claim 1, wherein a center of an inner diameter of the pin boot and a center of an outer diameter of the entire said bellows portion are shifted from each other.

4. The pin boot of claim 1, wherein a center of an inner diameter of the pin boot and a portion of said bellows portion adjacent to said seal portion of the pin boot are shifted from each other.

5. The pin boot of claim 1, further comprising a rib in a connecting portion for connecting said seal portion and said bellows portion of the pin boot, said rib being disposed in one of an inclined manner and a non-uniform manner in the circumferential direction of the pin boot.

* * * * *